US008152067B2

(12) United States Patent
Quine (10) Patent No.: US 8,152,067 B2
(45) Date of Patent: *Apr. 10, 2012

(54) TIME LIMITED BUSINESS REPLY MAIL

(75) Inventor: Douglas B. Quine, Bethel, CT (US)

(73) Assignee: Pitney Bowes Inc., Stamford, CT (US)

( * ) Notice: Subject to any disclaimer, the term of this patent is extended or adjusted under 35 U.S.C. 154(b) by 489 days.

This patent is subject to a terminal disclaimer.

(21) Appl. No.: 11/967,624

(22) Filed: Dec. 31, 2007

(65) Prior Publication Data

US 2009/0166401 A1 Jul. 2, 2009

(51) Int. Cl.
| | |
|---|---|
| *G06K 7/10* | (2006.01) |
| *G06K 7/14* | (2006.01) |
| *G06K 19/00* | (2006.01) |
| *G06K 19/06* | (2006.01) |
| *G06K 15/00* | (2006.01) |
| *G11B 5/09* | (2006.01) |
| *G11B 7/10* | (2006.01) |
| *G06F 17/00* | (2006.01) |
| *G07B 15/02* | (2011.01) |
| *G07B 17/02* | (2012.01) |
| *G06Q 20/00* | (2006.01) |

(52) U.S. Cl. ............... 235/462.01; 235/454; 235/462.18; 235/487; 235/491; 235/375; 235/378; 235/384; 235/385; 705/401; 705/60; 705/28; 705/29

(58) Field of Classification Search .................. 235/454, 235/462.18, 487, 491, 375, 378, 384, 385; 705/401, 60, 28, 29
See application file for complete search history.

(56) References Cited

U.S. PATENT DOCUMENTS

| | | | | | |
|---|---|---|---|---|---|
| 3,662,181 | A | * | 5/1972 | Hercher et al. | 235/462.04 |
| 3,812,328 | A | * | 5/1974 | Tramposch | 235/487 |
| 4,256,493 | A | * | 3/1981 | Yokoyama et al. | 106/31.58 |
| 4,263,503 | A | * | 4/1981 | Bianco | 235/487 |
| 4,775,786 | A | * | 10/1988 | Yamano et al. | 235/490 |
| 4,780,835 | A | * | 10/1988 | Sievel et al. | 705/408 |
| 4,879,166 | A | * | 11/1989 | Misuda et al. | 428/212 |
| 5,017,226 | A | * | 5/1991 | Kulisz | 106/31.17 |
| 5,058,088 | A | * | 10/1991 | Haas et al. | 368/327 |
| 5,058,925 | A | * | 10/1991 | Dotson | 283/95 |
| 5,096,813 | A | * | 3/1992 | Krumhar et al. | 435/28 |
| 5,128,527 | A | * | 7/1992 | Kawai et al. | 235/462.07 |
| 5,292,018 | A | * | 3/1994 | Travisano | 215/246 |
| 5,457,307 | A | * | 10/1995 | Dumont | 235/383 |
| 5,506,943 | A | * | 4/1996 | Furukawa | 358/1.14 |
| 5,513,264 | A | * | 4/1996 | Wang et al. | 380/51 |
| 5,521,371 | A | * | 5/1996 | Hotta et al. | 235/487 |
| 5,633,835 | A | * | 5/1997 | Haas et al. | 368/327 |
| 5,839,592 | A | * | 11/1998 | Hayes | 215/230 |
| 5,902,982 | A | * | 5/1999 | Lappe | 235/375 |
| 5,939,699 | A | * | 8/1999 | Perttunen et al. | 235/462.01 |
| 6,009,400 | A | * | 12/1999 | Blackman | 705/1.1 |
| 6,223,988 | B1 | * | 5/2001 | Batterman et al. | 235/472.01 |

(Continued)

*Primary Examiner* — Daniel Walsh
(74) *Attorney, Agent, or Firm* — George M. Macdonald; Charles R. Malandra, Jr.; Steven J. Shapiro (57) ABSTRACT

Systems and methods for utilizing time-dependent markings in systems including a mail delivery system for utilizing time-limited business reply mail are described. A business reply mail authorization permit is applied to a business reply mail piece using a time-dependent marking such as time-dependent ink. After the time-dependent ink changes state, the mail piece is no longer marked as an authorized business reply mail piece.

13 Claims, 7 Drawing Sheets

U.S. PATENT DOCUMENTS

| | | | |
|---|---|---|---|
| 6,685,094 B2* | 2/2004 | Cameron | 235/468 |
| 6,703,245 B2* | 3/2004 | Sumitani et al. | 436/136 |
| 6,752,430 B2* | 6/2004 | Holt et al. | 283/72 |
| 6,795,376 B2* | 9/2004 | Quine | 368/10 |
| 7,036,452 B1* | 5/2006 | Tester | 116/207 |
| 7,157,048 B2* | 1/2007 | Goldsmith et al. | 422/400 |
| 7,335,899 B2* | 2/2008 | Blanton et al. | 250/474.1 |
| 7,562,811 B2* | 7/2009 | Nemet et al. | 235/375 |
| 2002/0016739 A1* | 2/2002 | Ogasawara | 705/22 |
| 2002/0066781 A1* | 6/2002 | Santa Cruz et al. | 235/375 |
| 2002/0072079 A1* | 6/2002 | Woodaman | 435/7.32 |
| 2002/0179717 A1* | 12/2002 | Cummings et al. | 235/462.25 |
| 2003/0118210 A1* | 6/2003 | Patterson et al. | 382/100 |
| 2003/0179906 A1* | 9/2003 | Baker et al. | 382/101 |
| 2004/0018641 A1* | 1/2004 | Goldsmith et al. | 436/518 |
| 2005/0067489 A1* | 3/2005 | Jones et al. | 235/380 |
| 2005/0122564 A1* | 6/2005 | Zehner et al. | 359/296 |
| 2005/0139686 A1* | 6/2005 | Helmer et al. | 235/494 |
| 2005/0199724 A1* | 9/2005 | Lubow | 235/462.01 |
| 2006/0044341 A1* | 3/2006 | Reichelsheimer et al. | 347/19 |
| 2006/0054695 A1* | 3/2006 | Owada | 235/440 |
| 2006/0271011 A1* | 11/2006 | Mock et al. | 604/500 |
| 2007/0038713 A1* | 2/2007 | Ryu | 709/206 |
| 2007/0218206 A1* | 9/2007 | Reichert et al. | 427/256 |
| 2008/0029606 A1* | 2/2008 | Lewis | 235/491 |
| 2008/0111674 A1* | 5/2008 | Quine | 340/501 |
| 2009/0164390 A1* | 6/2009 | Calman et al. | 705/400 |
| 2009/0166401 A1* | 7/2009 | Quine | 229/300 |
| 2010/0036778 A1* | 2/2010 | DE Vulliod | 705/500 |
| 2010/0280511 A1* | 11/2010 | Rachlin et al. | 606/34 |

* cited by examiner

Anthraquinone dyes of the general chromophore formula:

TIME LIMITED BUSINESS REPLY MAIL

CROSS REFERENCE TO RELATED APPLICATIONS

This application is related to commonly-owned patent application Ser. No. 11/967,686, entitled "Systems and Methods for Producing and Processing Time Dependent Dynamic Barcodes in a Mail Delivery System" and filed contemporaneously herewith by Douglas B. Quine and Luis A. Sanchez, which related application is incorporated herein by reference.

FIELD OF THE INVENTION

The illustrative embodiments described in the present application are useful in systems including those for utilizing mail systems and more particularly are useful in systems including those for utilizing time-limited reply mail.

BACKGROUND

The United States Postal Service (USPS) operates a national mail and parcel delivery network including hundreds of major mail Processing and Distribution Centers (P&DCs) that process and forward mail pieces toward the destination address. The P&DCs process a tremendous volume of mail that may include hundreds of millions of letters and packages per day. The P&DCs employ automated processing equipment in the form of optical character readers, automated facer-cancellers, barcode sorters, and material handling systems. As a machineable mail piece is automatically processed in the P&DC national network, the destination barcode is used when the P&DC in possession of the mail piece decides where to send it next.

The USPS currently typically collects its delivery fee from the sender of an item through the use of postage stamps, a postage meter or a postage permit mark (used to charge against a permit postage account). However, the USPS does offer a reply mail service known as BUSINESS REPLY MAIL (BRM) that is frequently used for advertisement responses (e.g., magazine advertisement response cards) and customer reply mail (e.g., order fulfillment return envelopes). BUSINESS REPLY MAIL uses preprinted FIRST-CLASS MAIL pieces for which the business and not the customer pays for the return postage. The business interested in using the service applies for an advance deposit permit account and funds the account. The mail pieces (e.g., envelopes and postcards) are pre-addressed and marked with a BRM postage authorization. The USPS also offers volume discounts to businesses that receive a large quantity of such BRM mail pieces. Since the business does not pay the return postage unless the BRM mail piece is used, the business is not charged any postage for the printed BRM mail pieces that are discarded and never returned. Accordingly, the business does not have to waste postage by placing stamps on all of its reply mail.

Since the postage is charged to an advance deposit permit account that the business funds and maintains with the USPS, the business must maintain sufficient funds in that account relative to the BRM mail pieces that will be returned. A system for managing BRM accounts is described in commonly-owned U.S. Pat. No. 7,131,572 B2, entitled Automatic Business Reply Mail Funding, issued Nov. 7, 2006 to Miller, et al. and incorporated herein by reference. The preprinted BRM mail pieces sent to the public then remain a liability since they can be placed in the mail at any time. Unfortunately, for publicly distributed BRM mail pieces, there may be many BRM mail pieces that would not normally be returned, but that might be placed in a mail collection box by a prankster.

SUMMARY

The present application describes illustrative embodiments of systems and methods for utilizing mail systems and in certain embodiments described systems including those for utilizing time-limited business reply mail.

In one illustrative example, a reply mail envelope or label applied to the envelope is marked with a time-dependent authorization permit using time-dependent ink. After a period of time, the time-dependent ink changes visible states such that the reply envelope is no longer recognized as authorized recipient paid reply mail.

In another illustrative embodiment, an envelope is fitted with a display in order to produce a time-dependent reply mail authorization permit. The display includes a timer that determines when the display is set to switch from an authorized reply mail permit display to a different display that is not recognized as authorized recipient paid reply mail.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

The illustrative embodiments of the present application describe systems and methods for utilizing mail systems and in certain embodiments describe systems including those for utilizing time-limited reply mail.

BUSINESS REPLY MAIL is a valuable marketing tool because the prepaid and preaddressed mail piece encourages impulse purchases and eliminates the need to address and apply postage to a return mail piece. Many people do not maintain an inventory of postage at home. The inconvenience, cost and delay associated with obtaining postage to respond to an interesting offer causes many prospective buyers to abandon their purchase plans and causes lost business to direct mail marketers. However, such offers may be limited in time. Yet, there is no mechanism to force compliance with such time limits in returning a BRM mail piece. While a business may sometimes be willing to accept an order from a customer after the deadline, the date may represent the end of a manufacturing run, a deadline for production planning, or the end of an event season (e.g. tickets for sporting events). In such cases, BRM mail pieces received after the deadline would require postage payments to the USPS for mail which the business could not convert into revenue.

In at least certain embodiments, a reply mail envelope or label applied to the envelope is marked with a time-dependent authorization permit using time-dependent ink. After a period of time, the time-dependent ink changes visible states such that the reply mail is no longer recognized as authorized recipient paid reply mail. As described herein, several time-dependent marking systems may be utilized with the illustrative embodiments. However, an inkjet ink containing a reactive dye such as Reactive Blue 19 is described in detail.

In at least certain embodiments, an envelope is fitted with a display in order to produce a time-dependent reply mail authorization permit. The display includes a timer that determines when the display is set to switch from an authorized reply mail permit display to a different display that is not recognized as authorized recipient paid reply mail.

In certain illustrative embodiments described herein, a time-dependent marking such as a time-dependent ink permit authorization block may provide dynamic information to the legacy USPS mail processing equipment without requiring any equipment hardware or software changes.

Figure 1:
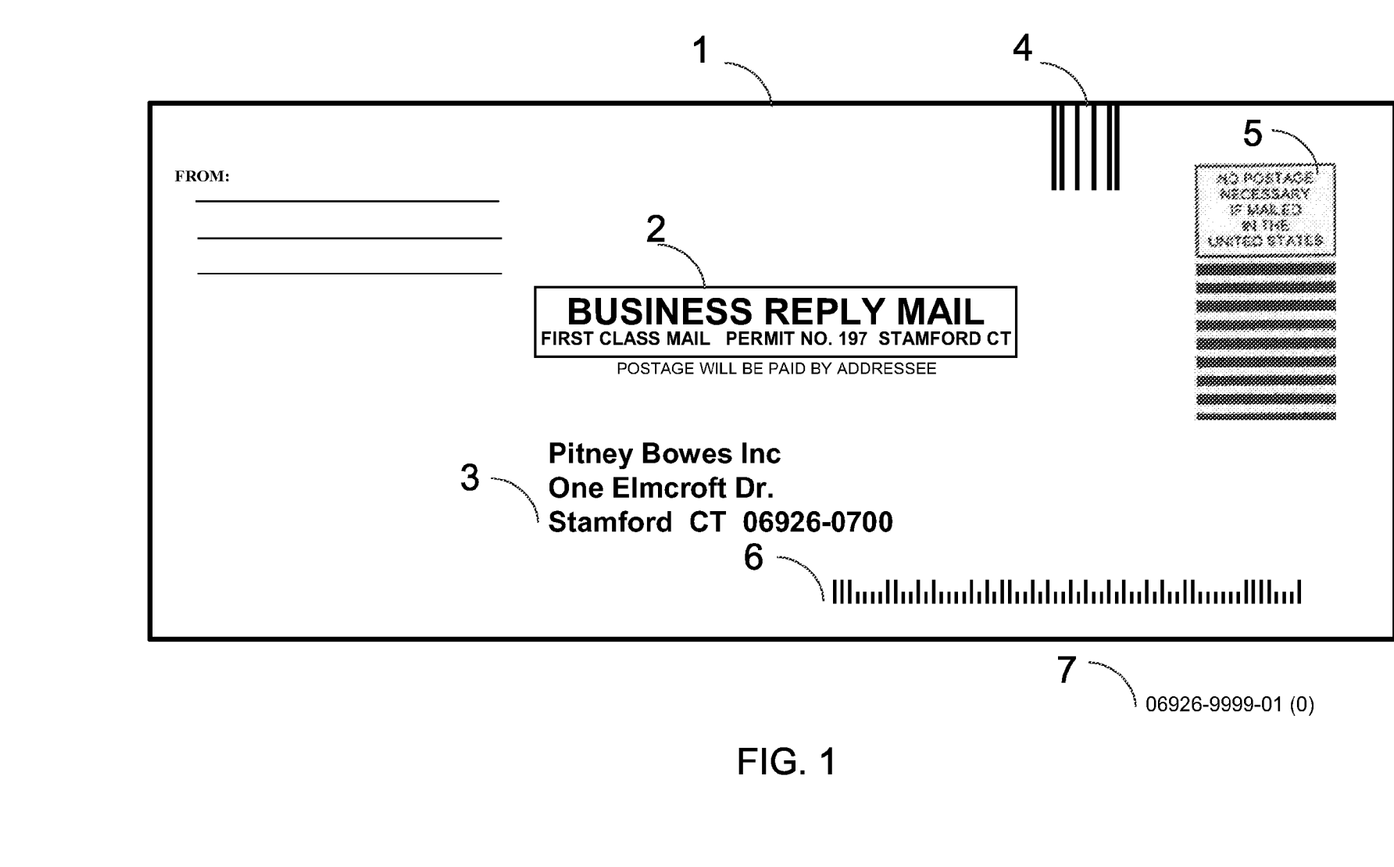
FIG. 1 is a schematic diagram of a representative envelope according to an illustrative embodiment of the present application.

Referring to FIG. 1, a schematic diagram of a representative envelope 1 according to an illustrative embodiment of the present application is shown. Envelope (mail piece) 1 is a business reply mail piece. It includes several markings including a standard FIM mark 4 and a postage block 5. The envelope 1 also includes markings for a BUSINESS REPLY MAIL authorization block 2 and the business address provided to receive the return mail 3. A destination POSTNET barcode 6 marking is provided which decodes as shown in 7 and provides a delivery information code. Such markings may be collectively referred to as postal information. In this illustrative example, all of the markings on envelope 1 are printed with a time-dependent ink that changes from dark to clear over time. Accordingly, the envelope 1 will convert to a blank condition (not shown) after the time-dependent ink changes state to a colorless state.

Figure 2:
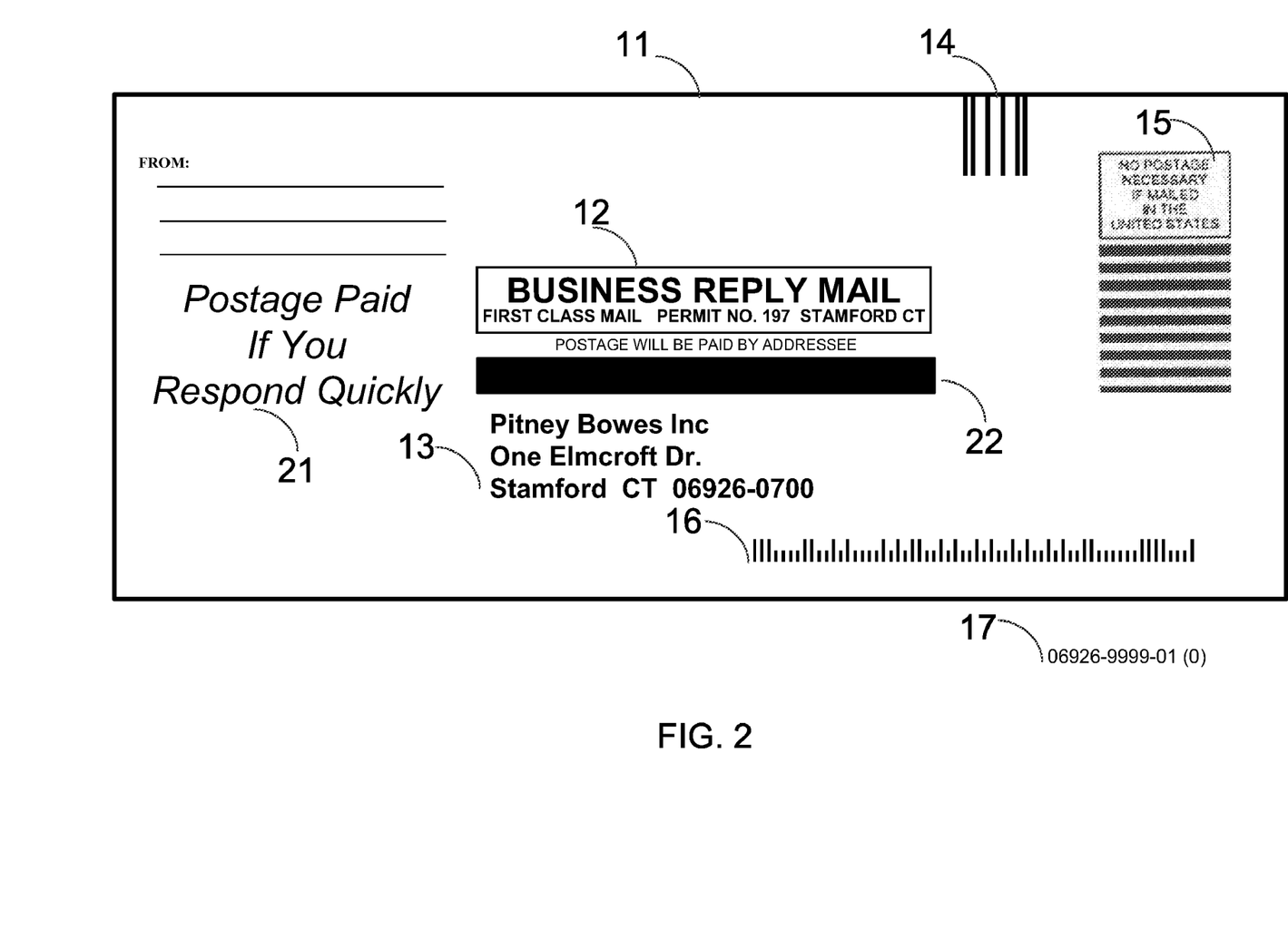
FIG. 2 is a schematic diagram of a representative envelope according to an illustrative embodiment of the present application.

Referring to FIG. 2, a schematic diagram of a representative envelope 11 according to another illustrative embodiment of the present application is shown at a first point in time. Envelope (mail piece) 11 is a business reply mail piece. It includes a standard FIM mark 14 and a postage block 15. The envelope 11 includes a BUSINESS REPLY MAIL authorization block 12 and the business address provided to receive the return mail 13. A destination POSTNET barcode 16 is provided which decodes as shown in 17. In this illustrative example, some of the markings on envelope 11 are printed with permanent ink and others are marked with a time-dependent ink that changes from dark to clear over time. As used herein, a permanent ink is a traditional ink that is not designed to change visible states within a time period of hours, days, weeks or months. Of course, permanent inks may degrade in unintended adverse conditions.

An offer text 21 indicates to the customer that prompt response will result in free postage. A blocking box 22 is printed over a barcode as will be apparent with reference to FIG. 3. The text 21 as well as the blocking box 22, the FIM 14, the POSTNET barcode 16, and most of the business reply indicia 15 are printed in a time-dependent ink that will fade away after a defined interval (variable according to the chemistry selected). The portions of indicia 15 that are printed in permanent ink will be apparent below with reference to FIG. 3. For example, a reactive ink chemistry that provides for ink fade in approximately one month may be used as appropriate for a time dependent offer.

Figure 3:
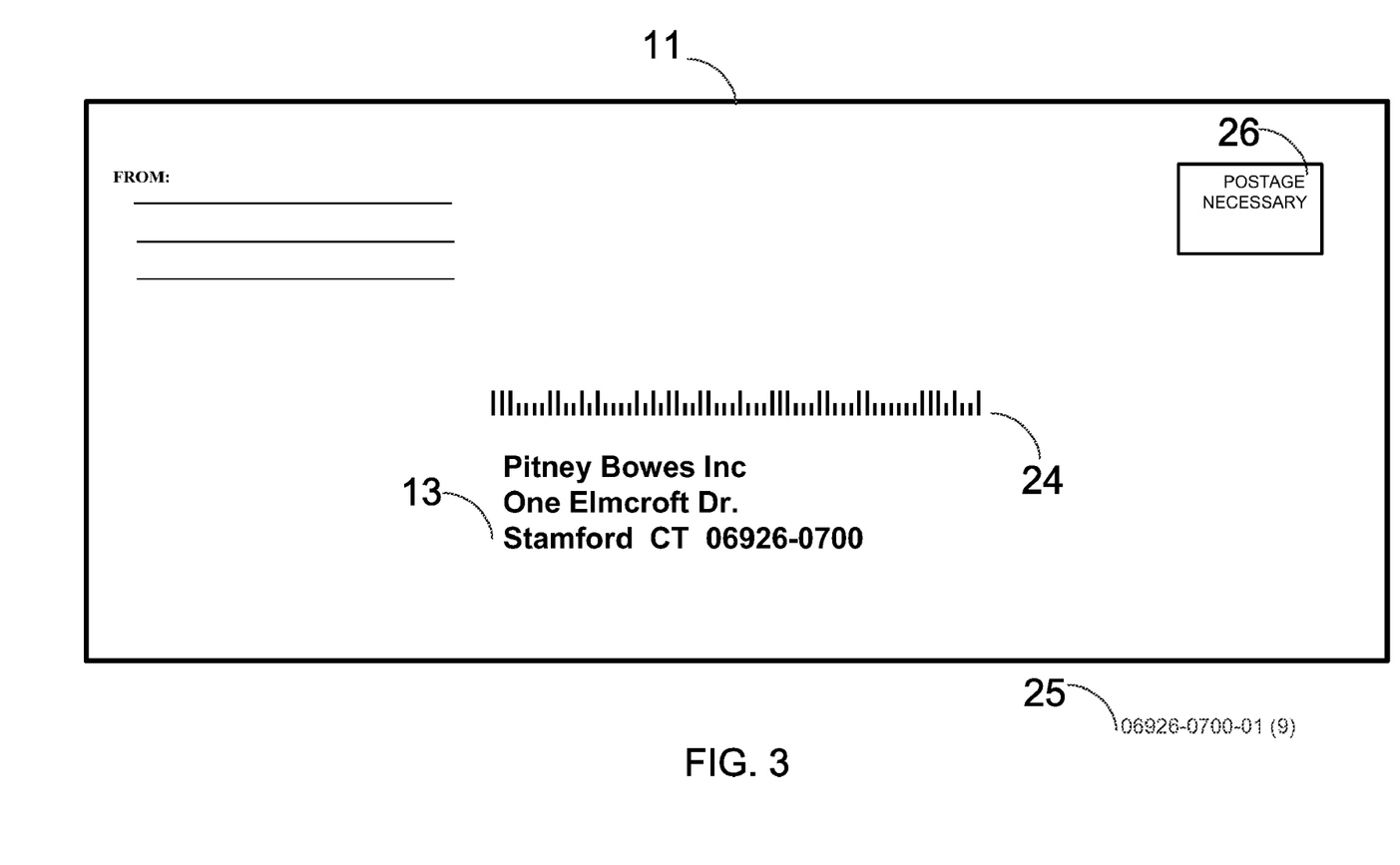
FIG. 3 is a schematic diagram of the envelope of FIG. 2 at another point in time.

Referring to FIG. 3, the envelope 11 is shown after the time-dependent reactive ink has changed visible states to the clear state. The POSTNET BARCODE 16, offer text 21 and authorization block 12 have completely disappeared. Blocking box 22 has also disappeared to reveal the permanent ink barcode 24. Additionally, most of indicia 15 has disappeared leaving behind the permanent ink portions that now become stamp template 26 to indicate that postage is now required. Accordingly, the postal indicia postal information field is partially printed in permanent ink and partially printed in time-dependent ink.

FIG. 3 illustrates the envelope of the present embodiment after the time-dependent ink visible state change interval has passed. Now the free postage offer, the business reply indicia and endorsement, and the original POSTNET barcode have disappeared. The envelope will no longer be directed to the USPS business reply mail accounting system (BRMAS) for automatic deduction from the standing account (large business). Small businesses will no longer be called to the postmaster's office for payment of postage due (with a significant surcharge) on the received business reply mail envelopes. Now the envelope is an ordinary courtesy reply envelope with a standard POSTNET (24). The postage area endorsement (26) indicates that postage is required. Accordingly, the envelope 11 will not be recognized as an authorized recipient paid business reply mail piece after the period of time required for the time-dependent ink to undergo its visible state change to clear.

Figure 4:
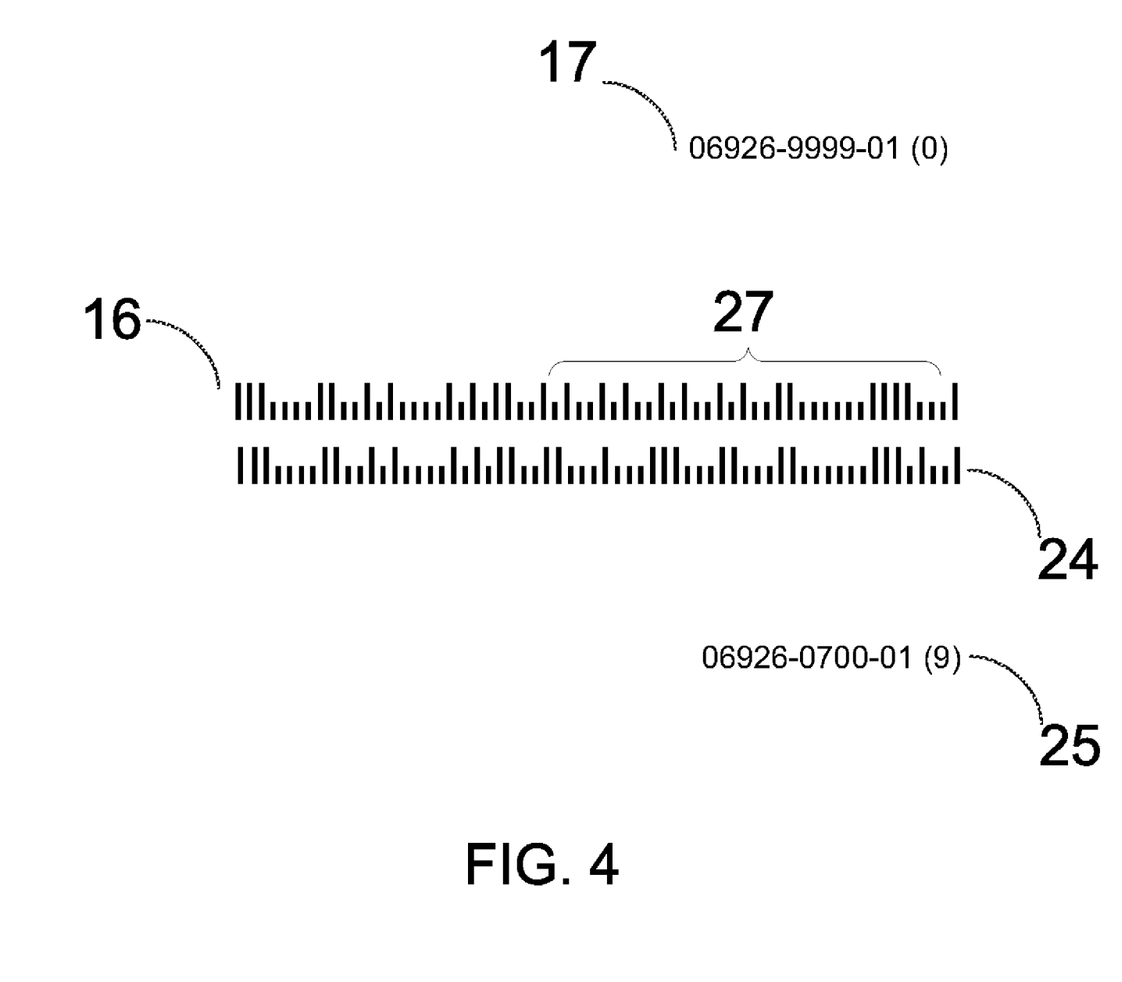
FIG. 4 is a schematic diagram showing the barcodes of FIG. 2 and FIG. 3.

Referring to FIG. 4, a schematic diagram showing the barcodes of FIG. 2 and FIG. 3 is shown. FIG. 4 illustrates the POSTNET barcode 16 for the business reply mail (sector-segment 9999) as decoded at 17 and the standard address barcode 24 for Pitney Bowes (sector-segment 0700) as decoded at 25. Differences in the barcodes can be observed at reference 27.

Figure 5:
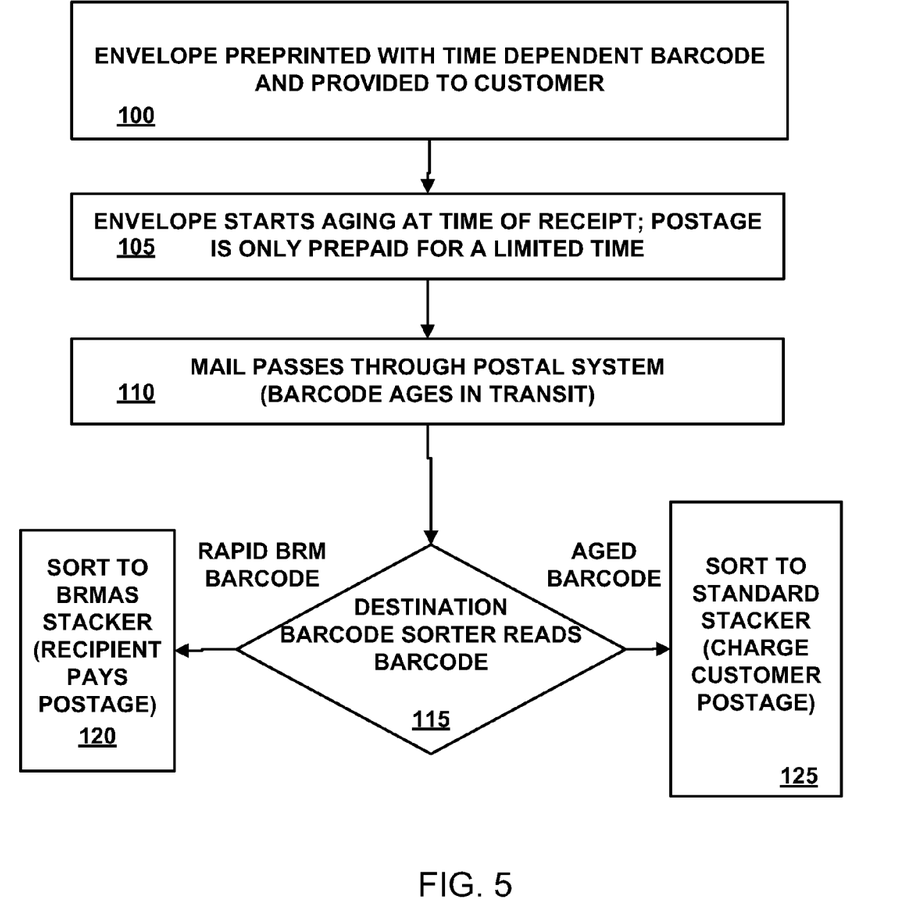
FIG. 5 is a flowchart of a representative method for processing the envelope of FIGS. 2-3 according to an illustrative embodiment of the present application.

Referring to FIG. 5, a flowchart of a representative method for processing the envelope of FIGS. 2-3 according to an illustrative embodiment of the present application is shown. FIG. 5 shows an illustrative process for using time-limited business reply mail. If they wished, businesses could charge back postage (and even add a service charge or nuisance fee) to a customer who mailed expired envelopes and attempted to avoid postage payment.

In step 100, a BRM envelope (mail piece) 11 is pre-printed with a time-dependent barcode and other time dependent sections as described herein and then provided to a customer, for instance, such as included with a monthly credit card statement. In step 105, the time-dependent markings of envelope 11 starts aging so that the BRM postage is only prepaid for a limited time. In step 110, the customer places the mail pieces 11 in the mailstream and the time-dependent ink continues to age as the mail piece is processed through the USPS network and P&DC sorters.

In step 115, the destination barcode sorter reads the barcode. If it is a Rapid BRM barcode, in step 120, the sorter sorts the mail piece to a BRMAS stacker and the business recipient pays for the postage using the permit account as described. If the barcode is the aged barcode, in step 125, the sorter sorts the mail piece to a standard stacker and the customer must have paid the postage.

Figure 6A:
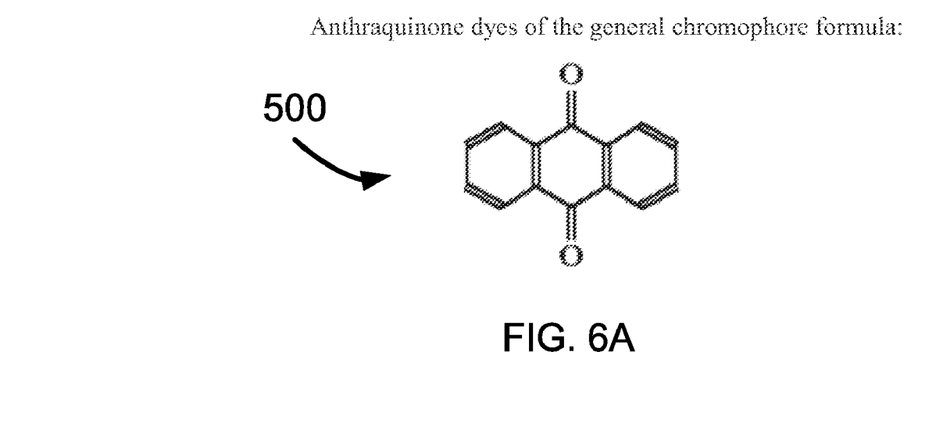
FIG. 6A is a graphical representation of a general chromophore formula of an Anthraquinone dye according to an illustrative embodiment of the present application.

Referring to FIG. 6A, a graphical representation of a general chromophore formula 500 of an Anthraquinone dye according to an illustrative embodiment of the present application is shown. In this marking alternative for the embodiments described herein, a reactive ink changes visible state from dark to clear over time. This ink may be used to create a time-dependent barcode by positively printing the first barcode using the reactive ink and then printing a "reverse print" dark block for a second barcode nearby. The oxidized reactive ink is printed on the portions of the block that must disappear to reveal the second (replacement) barcode.

The printing process involved includes a two step print process in which the constant marking portions are printed first and then any portions that must disappear over time are overprinted with an oxidizing solution to make those portions time dependent. The chemical reaction involved is:

Reactive Dye formulated inks+oxidizing agent→new product (colorless)  (EQ. 1)

Because this reaction is pH, metal type and oxidizing concentration dependent, these variables are used to control the marking ink fading time. Reactive dyes suitable for the inks described include Anthraquinone dyes of the general chromophore formula 500. Two specific examples are Reactive Blue 4 and Reactive Blue 19. Some examples of the oxidizing agents suitable for the time-dependent ink include (1) copper, manganese and other transition metal oxidizing salt solutions and (2) hydrogen peroxide solutions. An illustrative example of a reactive ink formulation is shown in Example 1:

| Component | Wt. % | Comment |
|---|---|---|
| Reactive Blue 19 | 5% | Reactive dye |
| Ethylene Glycol | 15% | Humectants |
| Butyl Carbytol | 5% | Penetrants |
| Buffer Solution | 10% | |
| Biocide | 1% | |
| Water | 64% | |

In an alternative, the permanent portions of the time-dependent marking such as a barcode are printed using a multi-ink print head using a first color of normal black ink and then using a second color having reactive ink to print the variable portions of the time-dependent marking. In yet another alternative, the reactive ink may be pre-mixed and used in an air-tight ink supply for a printer such as a collapsible bladder ink supply.

Figure 6B:
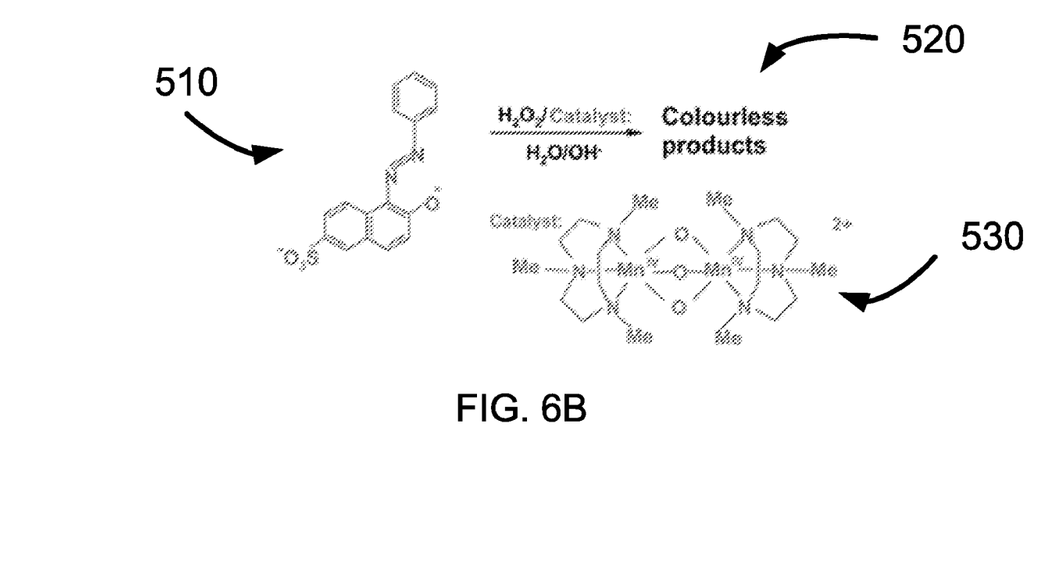
FIG. 6B is a graphical representation of a reaction of a marking compound according to an illustrative embodiment of the present application.

Referring to FIG. 6B, a graphical representation of a reaction of a Azo group marking compound 510, catalyst 530 and reaction 520 according to an illustrative embodiment of the present application. As an alternative, an Azo containing group will react as shown in FIG. 6B to produce a colorless product.

Certain known time changing marking systems may also be alternatively advantageously utilized with the printed illustrative embodiments described herein. For example, certain visitor badge systems have been employed utilizing time-dependent markings. In another alternative applicable as a substitute marking system to any of the illustrative embodiments herein, the "dark to light" conversions and "light to dark" conversions applicable to the described embodiments are achieved instead using microencapsulated dyes or inks such as those available in carbonless copy paper from NCR Corporation of Dayton, Ohio.

In another alternative applicable to any of the printed illustrative embodiments herein, disappearing inks such as those described and referred to in U.S. Pat. No. 4,171,982, issued Oct. 23, 1979 to Lin may be utilized and such patent is incorporated herein by reference. Similarly, methods for determining formulations have appropriate reactive oxidations times are known and such methods may be used such as those described and referred to in U.S. Pat. No. 7,001,091 B1, issued Feb. 21, 2006 to Knight and U.S. Pat. No. 5,759,246, issued Jun. 2, 1998 to Frey, et al., such patents being incorporated herein by reference.

Figure 7:
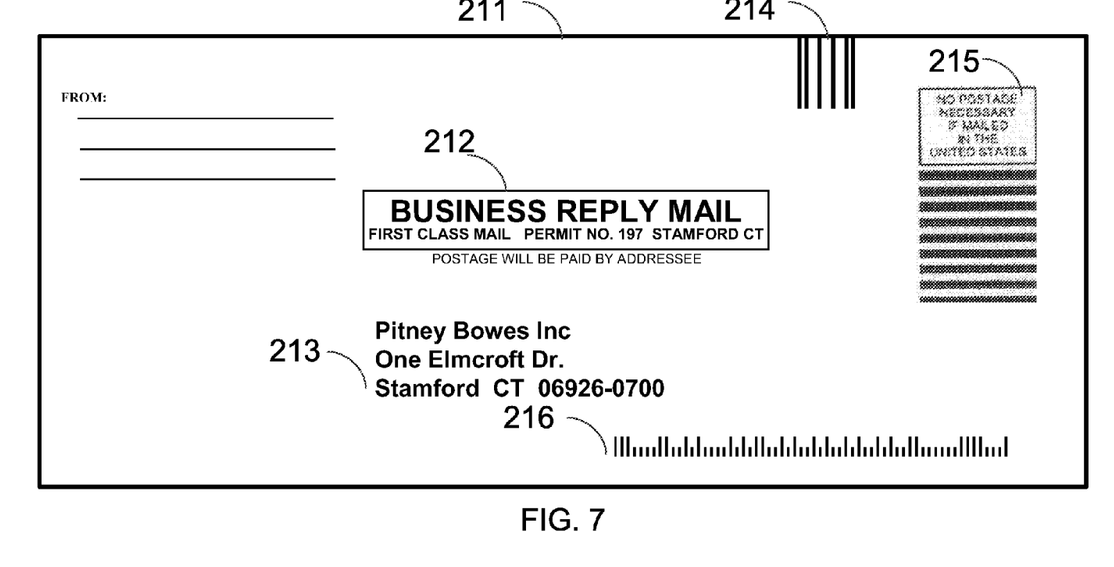
FIG. 7 is a schematic diagram of a representative display according to an illustrative embodiment of the present application.

Referring to FIG. 7, a schematic diagram of a representative display 211 according to an illustrative embodiment of the present application is shown. BRM mail piece 211 is shown at a first time frame. The mail piece 211 is a business reply envelope and includes standard FIM markings 214, a postage block 215 and permit field 212. The recipient address 213 and POSTNET barcode 216 is also displayed. The display includes a flexible EINK display adhered to the mail piece such as glued to a reusable envelope or as a reusable window or package insert. The display includes a processor (or state machine) including a timer (or counter) and appropriate memory for storing a second image to provide for a time dependent display. EINK flexible displays and associated processors are available from E Ink Corporation of Cambridge, Mass. and Plastic Logic Limited of Cambridge, United Kingdom.

At the second period of time, after the associated timer counts down, the display switches to a second period display (not shown) that will not be recognized as authorized business reply mail such as shown in FIG. 3.

Figure 8:
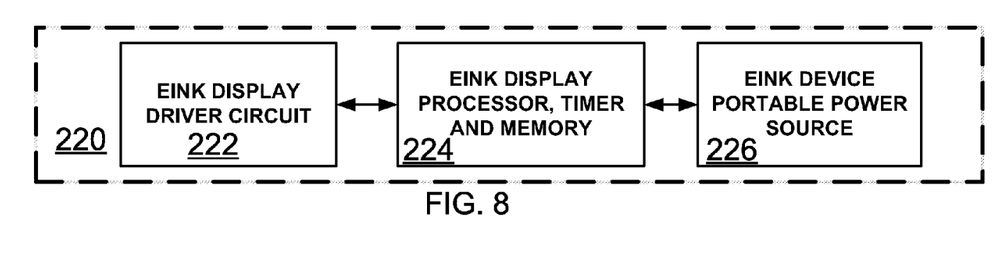
FIG. 8 is a schematic diagram of a display circuit according to an illustrative embodiment of the present application.

Referring to FIG. 8, a schematic diagram of a display circuit 220 according to an illustrative embodiment of the present application is shown. The display circuit includes a display driver circuit 222 and a display processor 224 including at least one timer and a memory. The EINK flexible display 211 and display circuit 226 is powered by portable power source 226. The power source 226 includes a battery, but may instead include a capacitor, ultra capacitor, paper battery, solar energy or inertia driven energy system. The display circuit 220 may be printed on the substrate including the display or may be contained in a traditional silicon chip.

Limited time BRM envelopes can be used to encourage prompt payment of bills. Although postage is not a major cost in most household budgets, free postage is a remarkably powerful incentive for action. This has been documented by the Disabled American Veterans who study response rates associated with stamped response envelopes. The float on the funds associated with early payment of a credit card or other bill more than pays the cost to the business of paying postage for early bill payment. An additional slower responding ink can be used to allow collect payment for business reply mail that expired "in transit". This would prevent customer dissatisfaction (or unjustified charge backs of postage) when an envelope is mailed just before the ink switched states.

In the EINK alternative embodiments, a reusable EINK bill payment envelope is provided by a biller (credit card company, utility) as a business reply envelope for a limited time. A biller would be enticed to utilize such a system since the biller would benefit from a "float" related to early payment that repays postage cost; the customer gets the convenience of a prepaid envelope. These reusable envelopes may alternatively be sold to the customer ("lifetime prepaid remittance envelope"). At the time of mailing to the customer the e-ink configuration would be switched to the starting image configuration and the timer started. It might also be designed to have the timer start when the envelope is removed from the envelope by the customer), although some customers may not open their credit card bills immediately upon receipt.

EINK displays permit any pixel to display black or white (and later to change any pixels as desired). As can be appreciated with reference to the embodiments described above, a mail piece such as a return envelope with an EINK display front could be programmed at the time of mailing from business to customer to display: time-dependent business reply markings, a variety of time-dependent barcodes and time-dependent notifications such as for limited time offers (e.g., 10% off until December 24th).

Upon a set date or time (preprogrammed into timer electronics such as a 555 integrated circuit, clock, or other timer the timing could be very precise and instantaneously switch desired pixels from black to white or from white to black), the display on the face of the envelope could be changed to display a courtesy reply envelope, changed barcodes and/or a different permanent offer to replace the time-dependent offer (e.g., free monogramming with $500 purchase).

In any of the illustrative embodiments described herein, an optional grace period is employed such as to allow a biller to pay the applicable postage to accommodate a situation in which the time-dependent markings on the envelope flipped states just after the customer deposited the envelope in a mailbox.

While illustrative embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description.

I claim:

1. A reply mail piece comprising:
a substrate,
at least one time-dependent machine readable ink marking on the substrate including postal information encoded therein,
wherein the at least one marking is a time-dependent machine readable ink marking that changes visible state after a first predetermined time period due to exposure of the at least one time dependent machine readable ink marking to air,
wherein, during the first predetermined time period, the reply mail piece is recognized as authorized recipient paid reply mail via machine reading of the at least one time dependent machine readable ink marking; and after the first predetermined time period, the reply mail piece changes visible state and is no longer recognized as authorized recipient paid reply mail by machine reading of the at least one time dependent machine readable ink marking, and wherein the at least one time-dependent machine readable ink marking comprises a reactive ink and oxidizing agent, and
wherein the reply mail is piece is able to be processed for mailing as authorized recipient paid reply mail during the first predetermined time period by machine reading the at least one time-dependent machine readable ink marking, but is unable to be processed for mailing as authorized recipient paid reply mail after the first predetermined time period by machine reading the at least one time-dependent machine readable ink marking.

2. The reply mail piece of claim 1, further comprising:
at least one permanent marking on the substrate including postal information.

3. The reply mail piece of claim 1, wherein,
at least one time-dependent marking comprises a reply mail permit authorization field.

4. The reply mail piece of claim 1, wherein,
at least one time-dependent marking comprises a reply mail postal indicia block.

5. The reply mail piece of claim 1, wherein,
at least one time-dependent marking comprises a delivery information code.

6. The reply mail piece of claim 1, further comprising:
at least one offer text field marked using a time-dependent marking.

7. The reply mail piece of claim 2, wherein,
at least one of the at least one time-dependent marking is marked to cover at least one of the at least one permanent markings.

8. A reply mail piece comprising:
a display device comprising circuitry; and
a timer configured to determine a first predetermined time period;
wherein, the display device is configured to display a first image including machine readable postal markings only during the first time period when the predetermine time period has expired, the display device changes from displaying the first image to displaying a second, different image including machine readable postal markings,
wherein, the first image is configured to enable the reply mail piece be recognized and processed for mailing as authorized recipient paid reply mail by machine reading of the first image; and
the second image is not configured to enable the reply mail piece to be recognized and processed for mailing as authorized recipient paid reply mail by machine reading of the second image.

9. The reply mail piece of claim 8, wherein,
the first image includes an offer text and the second image does not include the offer text.

10. A method for manufacturing a reply mail piece having a substrate comprising:
marking the substrate with at least one postal information field using a time-dependent machine readable ink marking,
wherein marking the substrate using a time-dependent ink making comprising printing with a reactive ink and an oxidizing agent,
wherein the time-dependent marking changes from a first machine-readable state to a second different machine readable state due to exposure to air for a predetermined time,
wherein the changing of state changes how the reply mail piece is processed for mailing by machine reading of first and second machine readable state,
and wherein the printing with a reactive ink and an oxidizing agent is performed by a printer device.

11. The method of claim 10, further comprising:
marking the substrate with at least one postal information field using a permanent marking.

12. The method of claim 10, further comprising:
marking the substrate with at least one postal information field, wherein the at least one postal information field is partially marked using a permanent marking and partially marked using a time-dependent marking.

13. The method of claim 11, wherein,
marking the substrate using a permanent marking comprises printing with an inkjet ink.

* * * * *